United States Patent
Wu

(10) Patent No.: US 8,717,319 B2
(45) Date of Patent: May 6, 2014

(54) INPUT DEVICE FOR TABLET COMPUTER

(75) Inventor: Chun-Che Wu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 347 days.

(21) Appl. No.: 13/239,730

(22) Filed: Sep. 22, 2011

(65) Prior Publication Data

US 2013/0009878 A1  Jan. 10, 2013

(30) Foreign Application Priority Data

Jul. 8, 2011 (TW) ................................. 100124184

(51) Int. Cl.
*G06F 3/045* (2006.01)
(52) U.S. Cl.
USPC ................. 345/173; 361/679.55; 361/679.56; 361/679.59; 455/575.1; 455/575.6; 455/575.8; 206/320
(58) Field of Classification Search
USPC .................................. 345/156, 169; 361/700
See application file for complete search history.

(56) References Cited

U.S. PATENT DOCUMENTS

| | | | | |
|---|---|---|---|---|
| 5,283,714 | A | * | 2/1994 | Tsai et al. ................. 361/679.41 |
| 6,780,019 | B1 | * | 8/2004 | Ghosh et al. .................... 439/31 |
| 6,829,140 | B2 | * | 12/2004 | Shimano et al. ......... 361/679.09 |
| 8,369,074 | B2 | * | 2/2013 | Chou et al. ............... 361/679.09 |
| 8,467,186 | B2 | * | 6/2013 | Zeliff et al. ............. 361/679.56 |
| 2008/0055827 | A1 | * | 3/2008 | Homer et al. ................. 361/680 |
| 2011/0167181 | A1 | * | 7/2011 | Minoo et al. .................... 710/73 |

* cited by examiner

*Primary Examiner* — Grant Sitta
(74) *Attorney, Agent, or Firm* — Kirton McConkie; Evan R. Witt

(57) ABSTRACT

An input device for a tablet computer is provided. The input device includes a base and a touch switch member. The touch switch member includes a touch element and a power switch. The touch element is pivotally coupled with the base and exposed to a top surface of the base. When the tablet computer is placed on the base, the touch element is moved from an initial position to a triggered position through the tablet computer. Consequently, the power switch is pressed down and turned on.

11 Claims, 5 Drawing Sheets

INPUT DEVICE FOR TABLET COMPUTER

FIELD OF THE INVENTION

The present invention relates to an input device for a tablet computer, and more particularly to an input device for supporting a tablet computer and inputting a command or an information into the tablet computer.

BACKGROUND OF THE INVENTION

Recently, a tablet computer is introduced into the market. Due to the slim shape, the tablet computer is now rapidly gaining in popularity. Generally, the display screen of the tablet computer is a touch screen. Via the touch screen, the user may input commands into the tablet computer to control operations of the tablet computer. Generally, when the user wants to input a character or a symbol into the tablet computer, an on-screen keyboard is enabled and shown on the touch screen of the tablet computer. The on-screen keyboard is virtual keyboard simulating the real keyboard device. By touching an icon of the on-screen keyboard, a corresponding character or symbol is inputted into the tablet computer. In other words, characters or symbols may be directly inputted into the tablet computer without any external keyboard device.

As known, the area of the display screen of the tablet computer is usually smaller than the area of the general keyboard device. Consequently, the icon of the on-screen keyboard shown on the tablet computer is usually smaller than the key of the general keyboard device. Under this circumstance, the on-screen keyboard may be erroneously touched by the user. Moreover, the use of the touch screen to input characters or symbols becomes hindrance for most users who are familiar with the general personal computers or notebook computers. Consequently, in many circumstances, an external keyboard is additionally prepared by the user. For operating the tablet computer, the external keyboard is in communication with the tablet computer. In addition, the tablet computer is placed and supported on a prop stand (e.g. a bookshelf). That is, the tablet computer is considered as a display screen with a host, and the external keyboard is used for inputting characters or symbols.

For complying with the requirement of using the external keyboard device for the tablet computer, an input device with a supporting function has been disclosed. Such an input device can provide the functions of fixing the external keyboard and supporting the tablet computer. FIG. 1 is a schematic perspective view illustrating a conventional input device with a supporting function. The conventional input device 1 comprises a base 10, an upper cover 11 and a keyboard 12. A prop tray 101 is disposed within the base 10. The prop tray 101 may be pulled out from the base 10. In addition, the prop tray 101 has a plurality of stopping parts 102. The upper cover 11 has a foldable part 111. After the upper cover 11 is lifted and the keyboard 12 is exposed, the foldable part 111 may be folded backwardly and then stopped by the one of the stopping parts 102. Meanwhile, the tablet computer 13 may be placed on the base 10 and the tablet computer 13 is supported by the upper cover 11. Consequently, the viewing angle of the tablet computer 13 is suitable to the user.

However, the conventional input device still has some drawbacks. For example, the space of the base is mainly used for accommodating the prop tray and the controller (or controlling circuit) of the keyboard. The remaining space of the base is usually useless. In other words, the space utilization of the base is usually insufficient.

SUMMARY OF THE INVENTION

The present invention provides an input device for a tablet computer, in which the space within the input is fully utilized. By operating a touch element which is exposed to a top surface of the base, the function of controlling the power switch of the input device is achievable.

In accordance with an aspect of the present invention, there is provided an input device for a tablet computer. Via the input device, a command or an information can be inputted into the tablet computer. The input device includes a base and a touch switch member. A keyboard and a placement region are disposed on a top surface of the base, and the placement region has a hollow portion. The touch switch member is disposed on the base, and includes a touch element and a power switch. The touch element is pivotally coupled to the base, and includes a touching part, an extension part and a pivotal part. The touching part is exposed to the hollow portion. The pivotal part includes a first torsion spring. When the tablet computer is placed on the placement region, the touching part is moved from an initial position to a triggered position by the tablet computer, so the power switch is pressed down and turned on by the extension part.

In an embodiment, a wireless transmission module and a circuit board are further disposed within the base. The power switch and the wireless transmission module are disposed on the circuit board. The wireless transmission module is in communication with the keyboard and the tablet computer.

In an embodiment, the input device further includes a main power switch and a power source, which are disposed on the base, wherein the main power switch is electrically connected with the power source and the circuit board.

In an embodiment, the wireless transmission module is a Bluetooth transmission module.

In an embodiment, when the power switch is first turned on, the wireless transmission module is enabled and operated in a search mode.

In an embodiment, a first end of the first torsion spring is sustained against the base, and a second end of the first torsion spring is sustained against the touch element. When the tablet computer is detached from the placement region, the touch element is returned to the initial position through the first torsion spring.

In an embodiment, the touch element further includes a first compression spring, which is located at a first end of the touch element. When the tablet computer is detached from the placement region, the touch element is returned to the initial position through the first compression spring.

In an embodiment, the touch element further includes a second compression spring, which is located at a second end of the touch element. When the tablet computer is detached from the placement region, the touch element is returned to the initial position through the second compression spring.

In an embodiment, the input device further includes a prop stand, which is disposed on the base for supporting the tablet computer.

In an embodiment, the placement region is a concave structure.

In an embodiment, the pivotal part of the touch element further includes a first shaft, a second shaft and a second torsion spring, and the base further includes a first pivotal hole and a second pivotal hole. The first shaft is penetrated through the first pivotal hole. The second shaft is penetrated through the second pivotal hole. The first torsion spring is sheathed around the first shaft. The second torsion spring is sheathed around the second shaft.

In an embodiment, a first end of the second torsion spring is sustained against the base, and a second end of the second torsion spring is sustained against the touch element.

In an embodiment, a clamping element is further disposed within the base, and the pivotal part includes a first shaft and the first torsion spring. The first shaft is pivotally coupled to the clamping element. The first torsion spring is sheathed around the first shaft.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
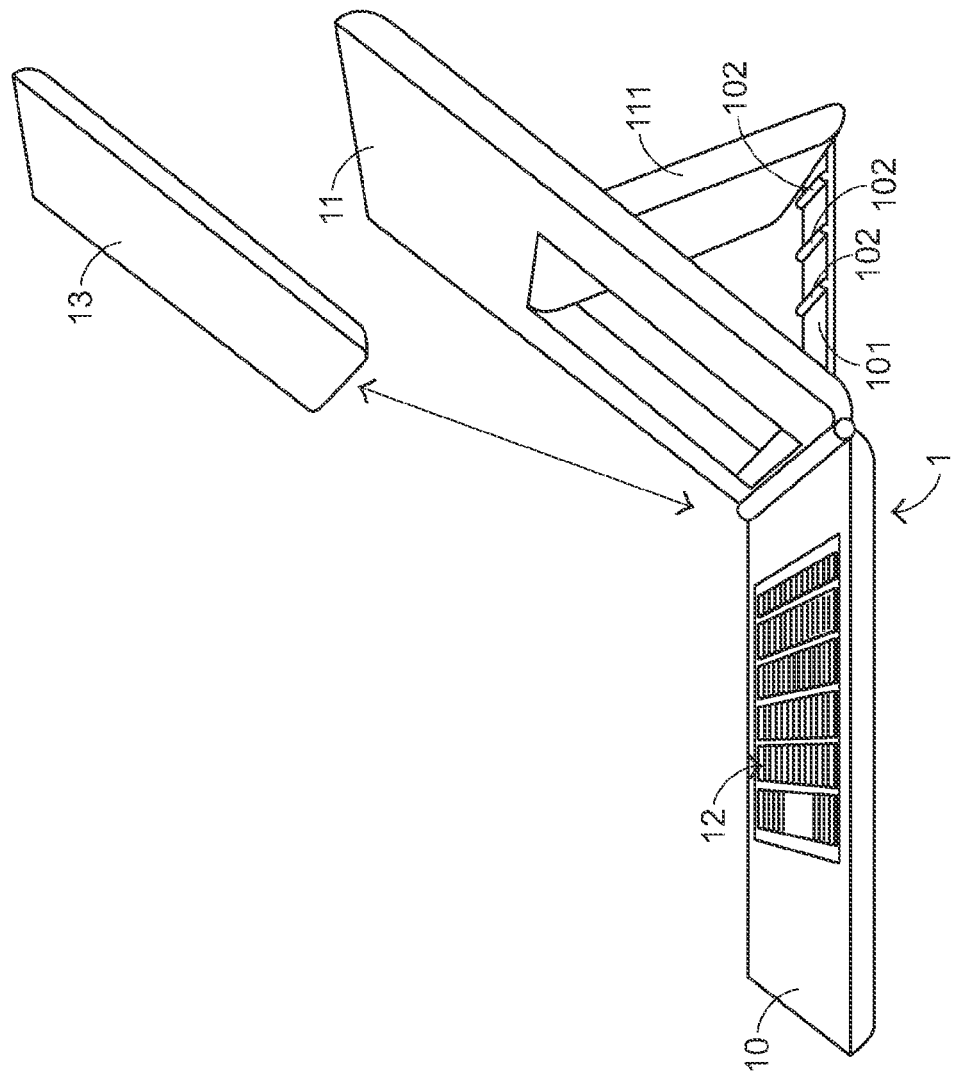
FIG. 1 is a schematic perspective view illustrating a conventional input device with a supporting function.
Figure 2:
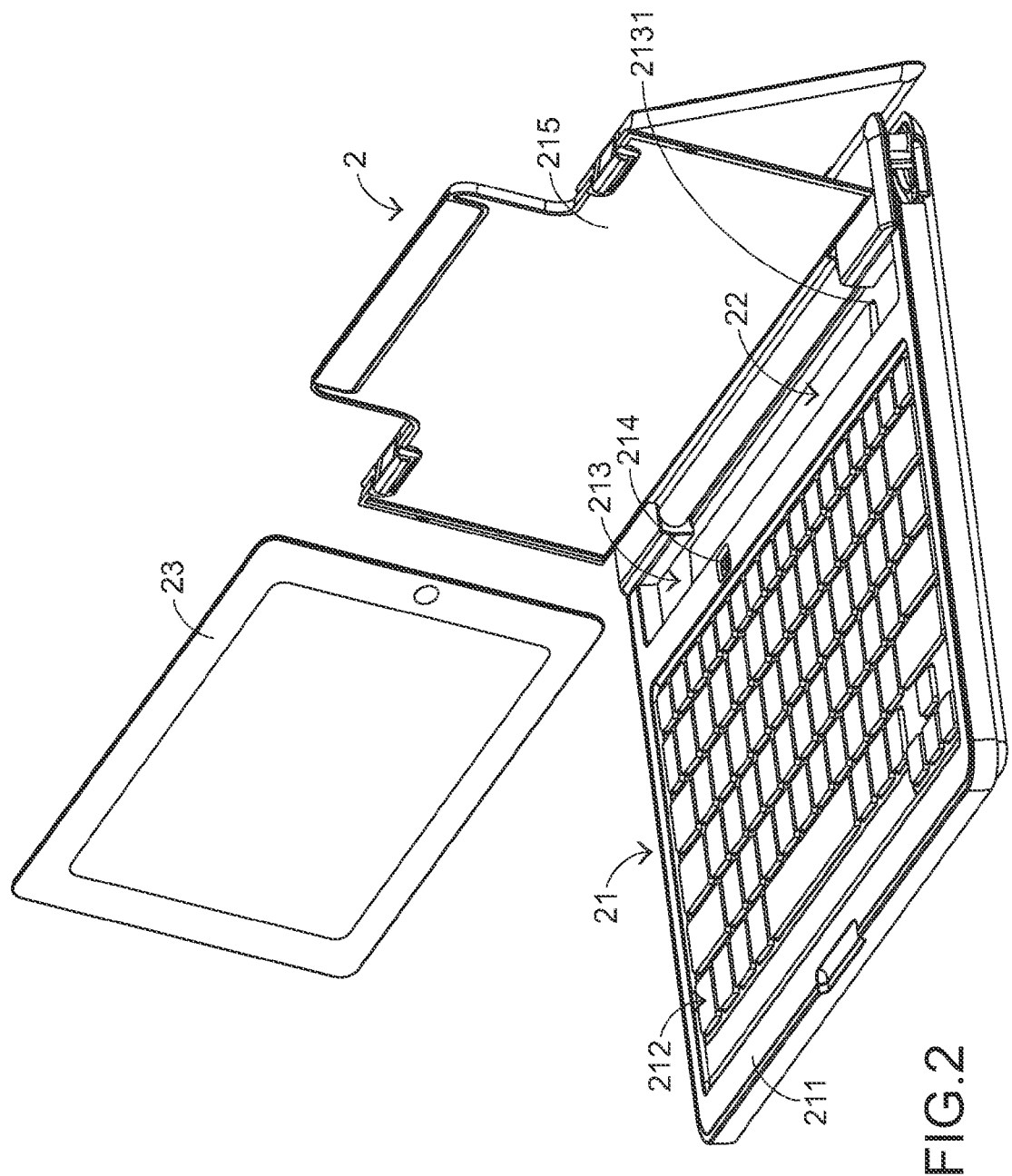
FIG. 2 is a schematic perspective view illustrating the outward appearance of an input device for a tablet computer according to a first embodiment of the present invention.

FIG. 2 is a schematic perspective view illustrating the outward appearance of an input device for a tablet computer according to a first embodiment of the present invention. The input device 2 is used for inputting a command or information to a tablet computer 23. The input device 2 comprises a base 21 and a touch switch member 22. A keyboard 212, a placement region 213, a main power switch 214 and a prop stand 215 are disposed on a top surface 211 of the base 21. Via the keyboard 212, the user can input the command or the information to the tablet computer 23. The placement region 213 has a hollow portion 2131. The placement region 213 is used for placing the tablet computer 23. In addition, the tablet computer 23 can be supported by the prop stand 215, so that the viewing angle of the tablet computer 13 is suitable to the user. In this embodiment, the placement region 213 is a concave structure for maintaining the viewing angle of the tablet computer 23 to be suitable to the user.

Figure 3:
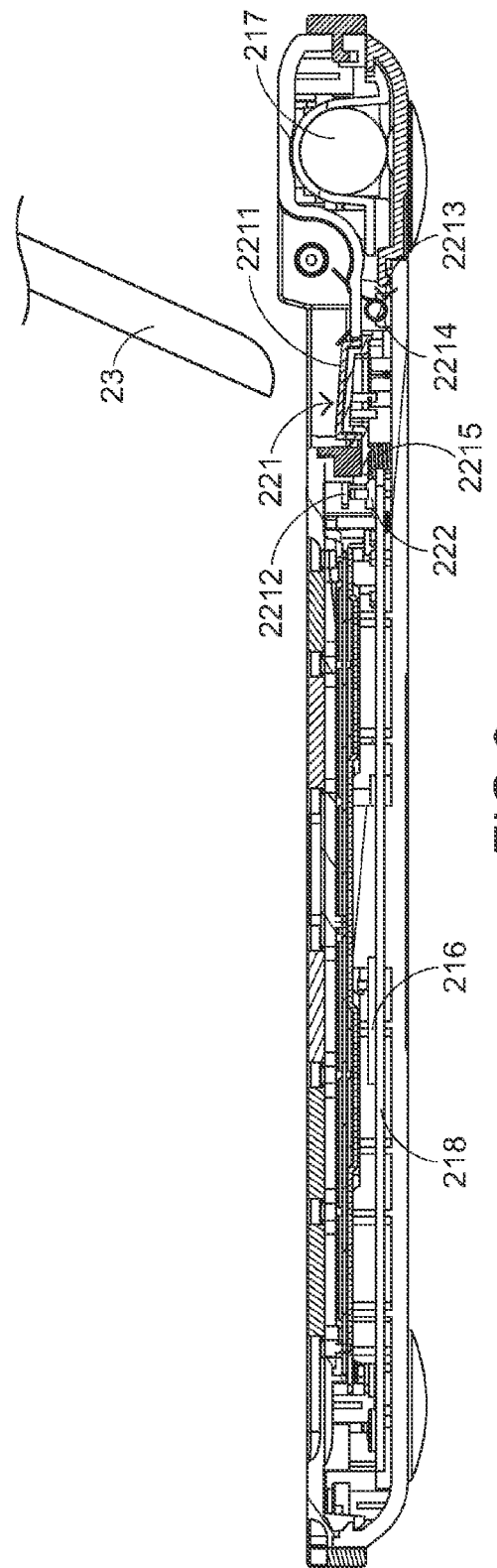
FIG. 3 is a schematic side view illustrating the internal portion of the base of the input device according to the first embodiment of the present invention, in which a touch element of the touch switch member is in an initial position.

FIG. 3 is a schematic side view illustrating the internal portion of the base of the input device according to the first embodiment of the present invention, in which a touch element of the touch switch member is in an initial position. As shown in FIG. 3, a wireless transmission module 216, a power source 217 and a circuit board 218 are further disposed within the base 21. The touch switch member 22 comprises a touch element 221 and a power switch 222. The power switch 222 and the wireless transmission module 216 are disposed on the circuit board 218. The touch element 221 is pivotally coupled to the base 21. The wireless transmission module 216 is communication with the keyboard 212 and the tablet computer 23. The main power switch 214 (not shown) is electrically connected with the power source 217 and the circuit board 218. In an embodiment, the wireless transmission module 216 is a Bluetooth transmission module.

Moreover, the touch element 221 comprises a touching part 2211, an extension part 2212 and a pivotal part 2213. The touching part 2211 is exposed to the hollow portion 2131. The pivotal part 2213 has a first torsion spring 2214. A first end of the first torsion spring 2214 is sustained against the base 21. A second end of the first torsion spring 2214 is sustained against the touch element 221. In addition, a first compression spring 2215 is located at an end of the touch element 221.

Hereinafter, the function of the touch element of the input device will be illustrated in more details with reference to FIGS. 2 and 3. For operating the input device 2 of the present invention, the main power switch 214 is firstly turned on, so that the keyboard 212 and the wireless transmission module 216 are powered by the power source 217. Meanwhile, although the keyboard 212 and the wireless transmission module 216 are powered, the keyboard 212 and the wireless transmission module 216 are still in a sleep state and the touching part 2211 is located at an initial position (see also FIG. 2). Then, the tablet computer 23 is placed on the placement region 213. As the touching part 2211 is contacted with and pressed by the tablet computer 23, the touching part 2211 along with the touch element 221 will be rotated from the initial position to a triggered position.

Figure 4:
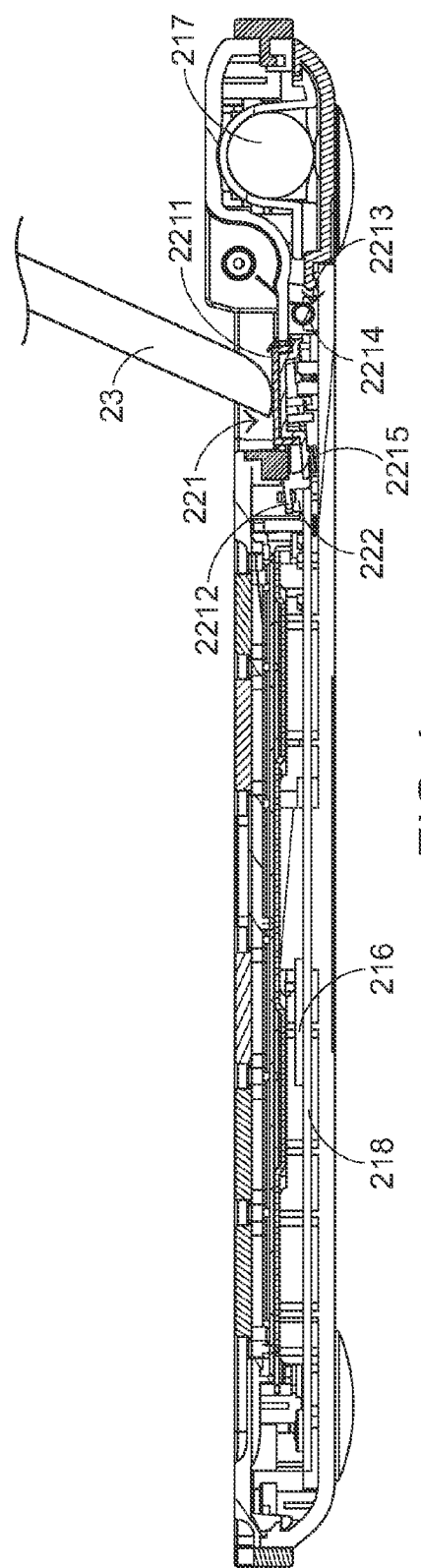
FIG. 4 is a schematic side view illustrating the internal portion of the base of the input device according to the first embodiment of the present invention, in which a touch element of the touch switch member is in a triggered position.

FIG. 4 is a schematic side view illustrating the internal portion of the base of the input device according to the first embodiment of the present invention, in which a touch element of the touch switch member is in a triggered position. Please refer to FIGS. 2 and 4. When the touching part 2211 is in the triggered position, the first compression spring 2215 is compressed and the first torsion spring 2214 is twisted. Under this circumstance, the extension part 2212 of the touch element 221 is contacted with the power switch 222, so that the power switch 222 is turned on. After the power switch 222 is turned on, the keyboard 212 and the wireless transmission module 216 are switched from the sleep state to a working state. Meanwhile, the user may communicate the wireless transmission module 216 with the keyboard 212 and the tablet computer 23. In addition, the user may input the information or the command into the tablet computer 23 via the keyboard 212.

In this embodiment, when the tablet computer 23 is first placed on the placement region 213 and the power switch 222 is first turned on, the wireless transmission module 216 is enabled and operated in a search mode. When the wireless transmission module 216 is in the search mode, the user needs to use the tablet computer 23 to communicate with the wireless transmission module 216. Afterwards, when the wireless transmission module 216 is enabled again, the wireless transmission module 216 can be directly in communication with the tablet computer 23. Consequently, the user may employ the keyboard 212 to input the information or the command to the tablet computer 23 quickly.

In a case that the user wants to disable the input device 2 of the present invention, the tablet computer 23 may be removed from the placement region 213. When the tablet computer 23 is detached from the placement region 213, the touch element 221 is returned from the triggered position to the initial position through the twisted first torsion spring 2214 and the compressed first compression spring 2215. Consequently, the power switch 222 is turned off. Under this circumstance, the communication between the keyboard 212 and the wireless transmission module 216 is interrupted, and the keyboard 212 and the wireless transmission module 216 enter the sleep state again.

In some other embodiments, the power switch 222 also has the function of the main power switch 214. Consequently, when the power switch is turned on, the keyboard 212 and the wireless transmission module 216 are powered by the power source 217. That is, as the touching part 2211 is contacted with and pressed by the tablet computer 23, the touching part 2211 along with the touch element 221 will be rotated from the initial position to the triggered position. Meanwhile, the keyboard 212 and the wireless transmission module 216 are powered by the power source 217. At the same time, the keyboard 212 and the wireless transmission module 216 are directly enabled and operated in the working state. Under this circumstance, the user may communicate the wireless transmission module 216 with the keyboard 212 and the tablet computer 23. In addition, the user may input the information or the command into the tablet computer 23 via the keyboard 212. After the tablet computer 23 is detached from the placement region 213, the touch element 221 is rotated from the triggered position to the initial position. Meanwhile, the power source 217 stops providing electricity to power the keyboard 212 and the wireless transmission module 216.

Figure 5:
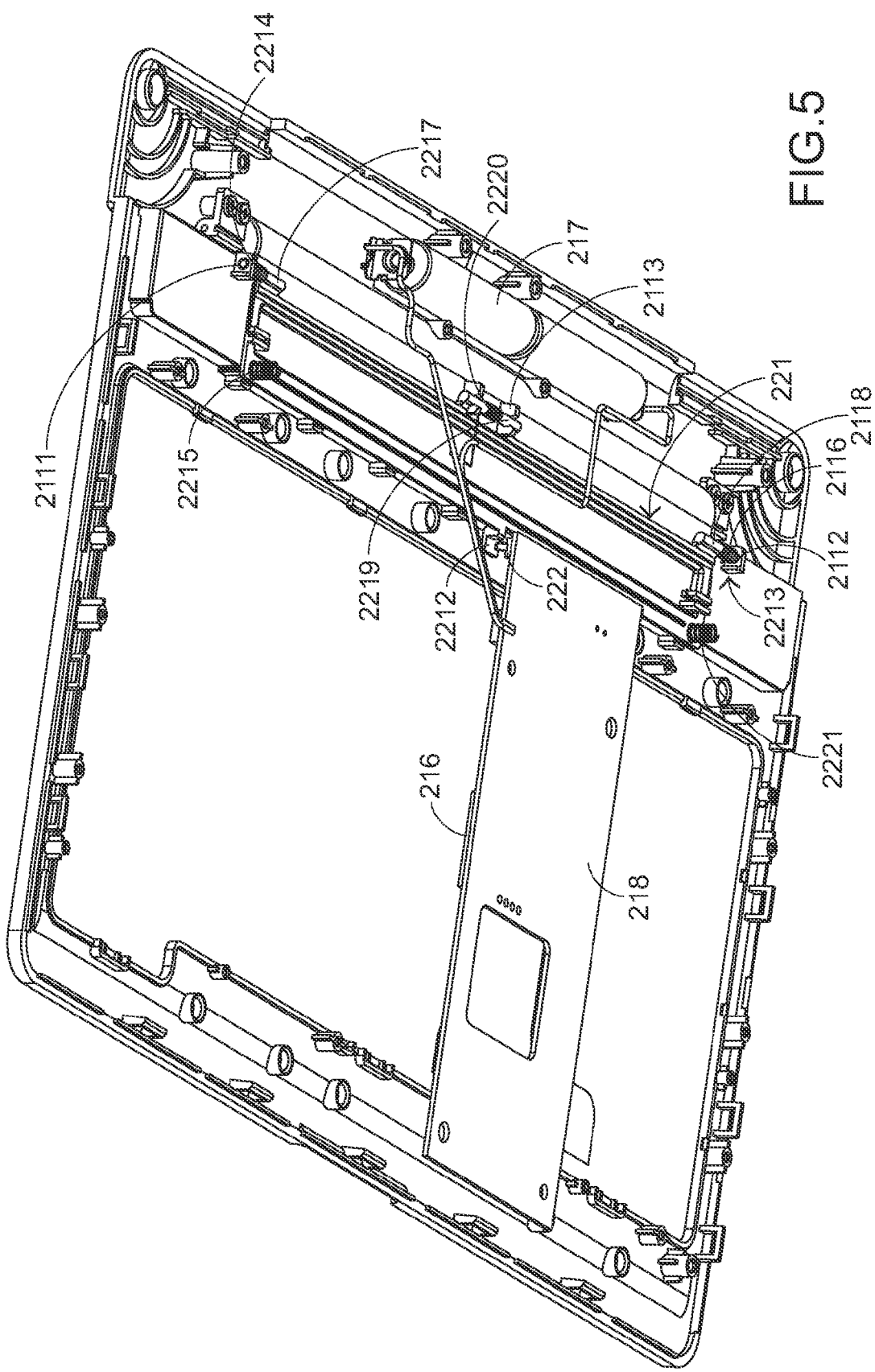
FIG. 5 is a schematic bottom view illustrating the internal portion of a base of an input device for a tablet computer according to a second embodiment of the present invention.

FIG. 5 is a schematic bottom view illustrating the internal portion of a base of an input device for a tablet computer according to a second embodiment of the present invention. In comparison with the input device of the first embodiment, the touch element 221 and the base 21 of the input device 2 of this embodiment are distinguished. The other components of the input device 2 of this embodiment are similar to those of the first embodiment, and are not redundantly described herein. As shown in FIG. 5, the base 21 comprises a first pivotal hole 2111 and a second pivotal hole 2112. The pivotal part 2213 of the touch element 221 comprises a first shaft 2217, a second shaft 2218, a second torsion spring 2216 and the first torsion spring 2214. The first shaft 2217 is penetrated through the first pivotal hole 2111. The second shaft 2218 is penetrated through the second pivotal hole 2112. The first torsion spring 2214 is sheathed around the first shaft 2217. In addition, the second torsion spring 2216 is sheathed around the second shaft 2218. The second torsion spring 2216 is identical to the first torsion spring 2214. A first end of the second torsion spring 2216 is sustained against the base 21, and a second end of the second torsion spring 2216 is sustained against the touch element 221. In such way, the touch element 221 can be stably installed in the base 21.

Moreover, a clamping element 2113 is further disposed within the base 21. The pivotal part 2213 further comprises a third shaft 2219 and a third torsion spring 2220. A second compression spring 2221 is located at a second end of the touch element 221. The third shaft 2219 is pivotally coupled to the clamping element 2113. In addition, the third torsion spring 2220 is sheathed around the third shaft 2219. Consequently, the pivotal structure of the touch element 221 is reinforced. In a case that the tablet computer 23 is detached from the placement region 213 (see FIG. 2), the touch element 221 can be accurately returned to the initial position through these torsion springs and these compression springs.

The shafts, the pivotal holes and the clamping element used in the input device of this embodiment may be modified or varied according to the space layout of the base. In addition, the positions of these components are not restricted to the above implementation examples. In a case that only one spring is employed for a long time period, the single spring is possibly suffered from elastic fatigue. Since a plurality of torsion springs and a plurality of compression springs are employed in the input device of the present invention, the problems of using the single spring will be avoided.

From the above description, the internal space within the base is fully utilized by the input device of the present invention. In addition, by placing the tablet computer on the input device or detaching the tablet computer from the input device, the power switch can be selectively turned on or turned off.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An input device for a tablet computer, said input device being operated to input a command or information into said tablet computer via said input device, said input device comprising:
    a base, wherein a keyboard and a placement region are disposed on a top surface of said base, and said placement region has a hollow portion; and
    a touch switch member disposed on said base, and comprising:
        a touch element pivotally coupled to said base, and comprising a touching part, an extension part and a pivotal part, wherein said touching part is exposed to said hollow portion, and said pivotal part comprises a first torsion spring, wherein said touch element further comprises a first compression spring, which is located at a first end of said touch element, wherein when said tablet computer is detached from said placement region, said touch element is returned to said initial position through said first compression spring and wherein said touch element further comprises a second compression spring, which is located at a second end of said touch element, wherein when said tablet computer is detached from said placement region, said touch element is returned to said initial position through said second compression spring; and
        a power switch, wherein when said tablet computer is placed on said placement region, said touching part is moved from an initial position to a triggered position by said tablet computer, so said power switch is pressed down and turned on by said extension part.

2. The input device according to claim 1 wherein a wireless transmission module and a circuit board are further disposed within said base, wherein said power switch and said wireless transmission module are disposed on said circuit board, and said wireless transmission module is in communication with said keyboard and said tablet computer.

3. The input device according to claim 2 wherein said input device further comprises a main power switch and a power source, which are disposed on said base, wherein said main power switch is electrically connected with said power source and said circuit board.

4. The input device according to claim 2 wherein said wireless transmission module is a Bluetooth transmission module.

5. The input device according to claim 2 wherein when said power switch is first turned on, said wireless transmission module is enabled and operated in a search mode.

6. The input device according to claim 1 wherein a first end of said first torsion spring is sustained against said base, and a second end of said first torsion spring is sustained against said touch element, wherein when said tablet computer is detached from said placement region, said touch element is returned to said initial position through said first torsion spring.

7. The input device according to claim 1 further comprising a prop stand, which is disposed on said base for supporting said tablet computer.

8. The input device according to claim 1 wherein said placement region is a concave structure.

9. An input device for a tablet computer, said input device being operated to input a command or information into said tablet computer via said input device, said input device comprising:
- a base, wherein a keyboard and a placement region are disposed on a top surface of said base, and said placement region has a hollow portion; and
- a touch switch member disposed on said base, and comprising:
  - a touch element pivotally coupled to said base, and comprising a touching part, an extension part and a pivotal part, wherein said touching part is exposed to said hollow portion, and said pivotal part comprises a first torsion spring, wherein said pivotal part of said touch element further comprises a first shaft, a second shaft and a second torsion spring, and said base further comprises a first pivotal hole and a second pivotal hole, wherein said first shaft is penetrated through said first pivotal hole, said second shaft is penetrated through said second pivotal hole, said first torsion spring is sheathed around said first shaft, and said second torsion spring is sheathed around said second shaft; and
  - a power switch, wherein when said tablet computer is placed on said placement region, said touching part is moved from an initial position to a triggered position by said tablet computer, so said power switch is pressed down and turned on by said extension part.

10. The input device according to claim 9 wherein a first end of said second torsion spring is sustained against said base, and a second end of said second torsion spring is sustained against said touch element.

11. The input device according to claim 1 wherein a clamping element is further disposed within said base, and said pivotal part comprises a first shaft and said first torsion spring, wherein said first shaft is pivotally coupled to said clamping element, and said first torsion spring is sheathed around said first shaft.

* * * * *